Figure 1:
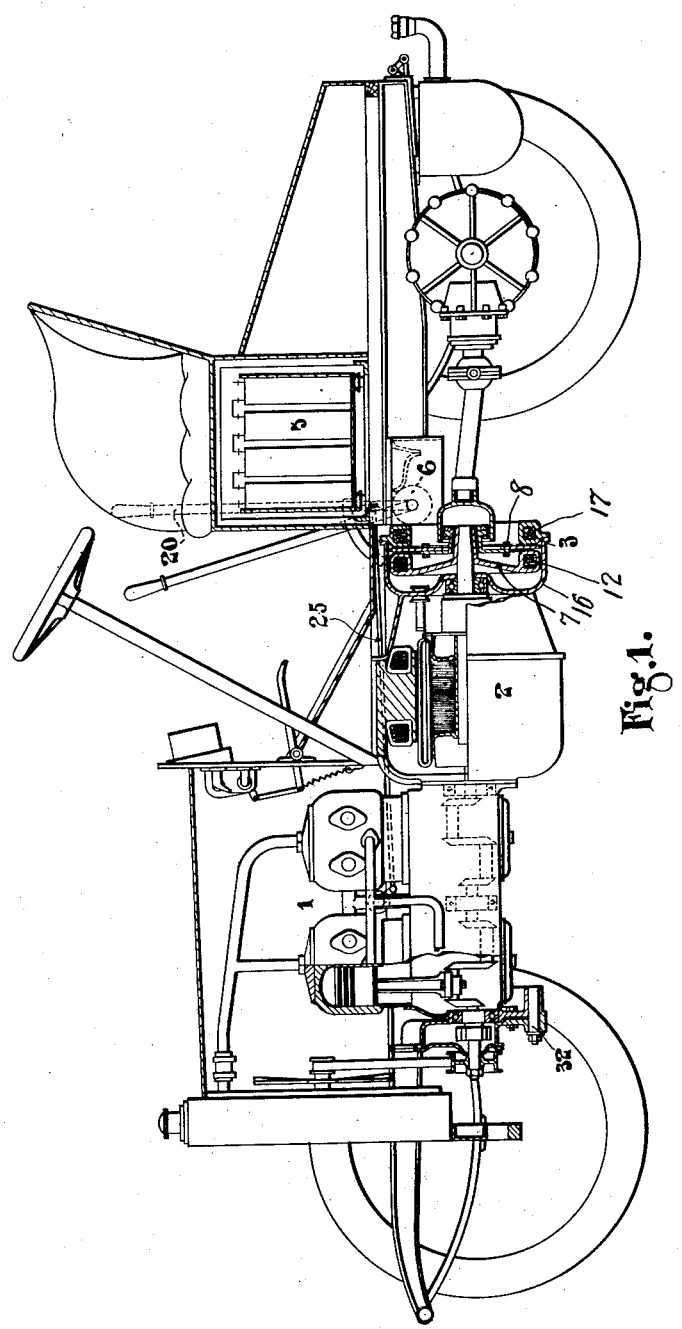

H. PIEPER.
MIXED DRIVE FOR AUTOVEHICLES.
APPLICATION FILED NOV. 23, 1905.

913,846.

Patented Mar. 2, 1909.
5 SHEETS—SHEET 1.

Witnesses:

Henri Pieper, Inventor by Kerr, Page & Cooper Att'ys.

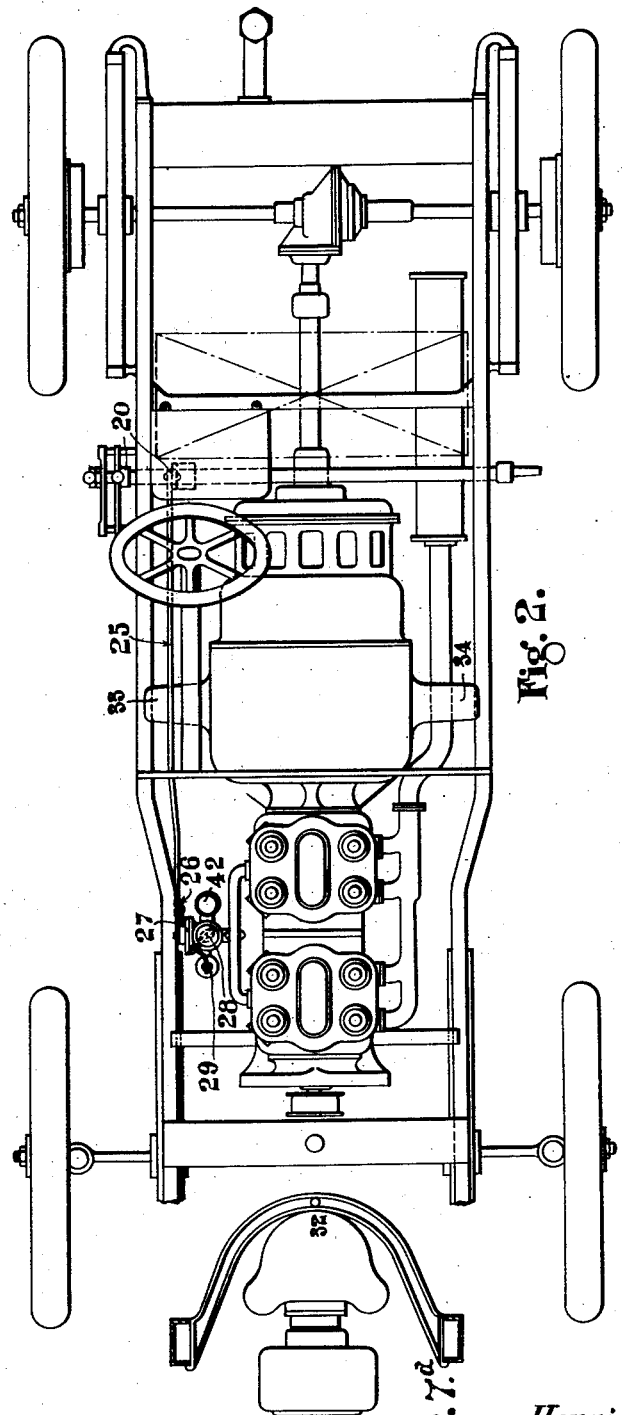

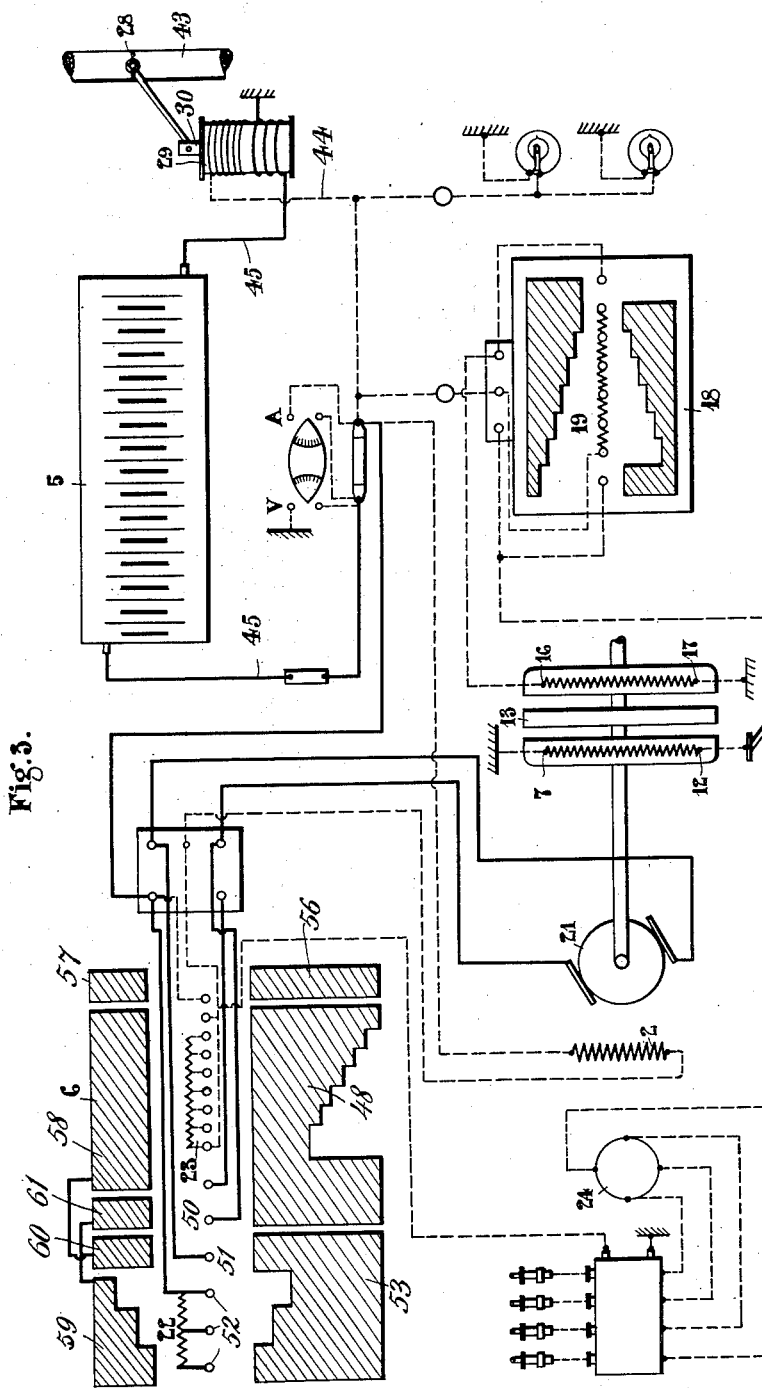

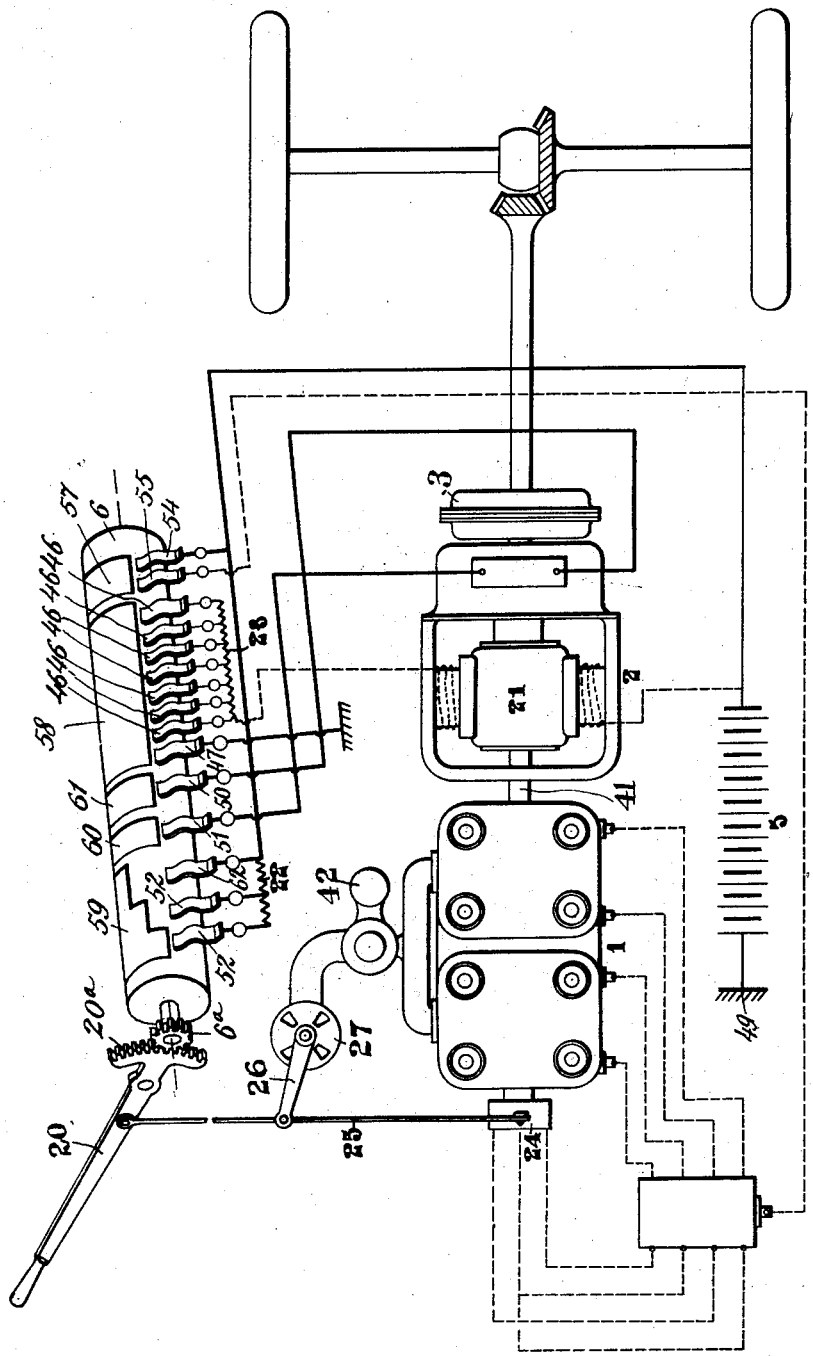

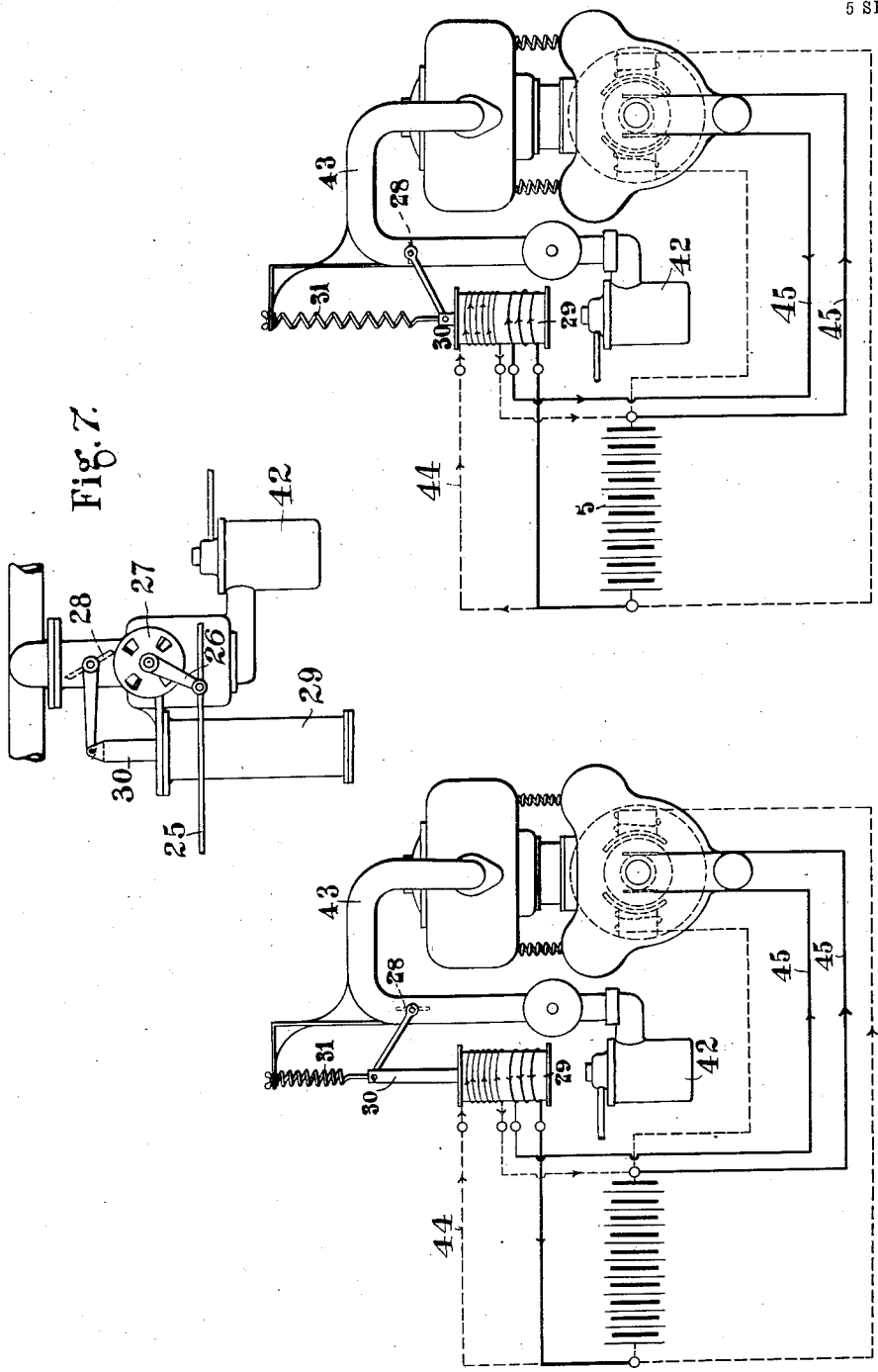

UNITED STATES PATENT OFFICE.

HENRI PIEPER, OF LIEGE, BELGIUM.

MIXED DRIVE FOR AUTOVEHICLES.

No. 913,846.      Specification of Letters Patent.      Patented March 2, 1909.

Application filed November 23, 1905. Serial No. 288,811.

*To all whom it may concern:*

Be it known that I, HENRI PIEPER, a subject of the King of Belgium, residing at 18 Rue des Bayards, in Liege, Belgium, have invented certain new and useful Improvements in Mixed Drives for Autovehicles; and I do hereby declare the following to be a full, clear, and exact description of the same, such as will enable others skilled in the art to which it appertains to make and use the same.

The invention, subject of my present application, is an improvement in power plants or systems, more particularly applicable to, and for that reason herein illustrated in connection with a vehicle or car, but like other systems of a kindred nature heretofore employed in the art adapted for other and similar purposes.

The invention finds embodiment in what is known as a mixed set or system, which, as is well known, comprises an internal combustion or similar engine, a dynamo motor direct connected therewith, and a storage battery or accumulator in circuit with the dynamo motor, these elements being coöperatively related so that the dynamo motor may be run as a motor by the electrical energy stored in the accumulator to start the engine or to furnish a portion of the power delivered by the set, or may be run as a generator by the engine, when the power of the latter is in excess of that demanded of the set, and caused to store energy in the accumulator.

The improvement consists in the combination with a power system of this kind and arranged substantially as heretofore, to constitute what is known as a mixed set, of new and improved means for effecting the regulation and control of the set as a whole, and in such details of construction as will be more fully hereinafter described and pointed out in the claims.

In the drawings hereto annexed, Figure 1 is a general view partly in section and partly in side elevation of an auto-car equipped with my improved system. Fig. 2 is a top plan view of the frame of such a car with the power system mounted thereon. Fig. 3 is a diagrammatic view of the several elements, illustrative of their relations and the necessary electrical connections. Fig. 4 is a partly diagrammatic view of a combined electrical and mechanical controller illustrating its relations to the engine and dynamo-motor. Figs. 5 and 6 are similar views illustrating the relations of an automatic controller to the other elements of the system. Fig. 7 is a view in elevation of the devices for controlling the amount and character of the explosive charges. Fig. 7ª is an end view of the car shown in Fig. 2, with the side members of the chassis in section.

Referring to the drawings and employing similar numerals to indicate corresponding parts in the several figures thereof, 1 represents any suitable form of internal combustion or thermal engine, mounted in the usual manner on the frame of a car and driving a shaft 41 direct-connected with a generator 2, which for the purposes of this combination is or may be a shunt wound dynamo of the usual type having the capability of operating either as a generator or as a motor, and hence known as a dynamo-motor.

The engine and dynamo motor work in parallel in driving the propelling shaft of the car through the medium of a magnetic friction clutch 3, and in circuit with said dynamo is a secondary battery or accumulator 5, conveniently placed under the seat of the vehicle.

The engine, the dynamo motor and the accumulator require no further detailed description, as they are, or may be, of any well known construction or character suitable for constituting what is well known in the art as a mixed power set.

The dynamo motor is primarily controlled, and a regulation of the mixed set in part effected by the hand lever 20 which is in a position readily accessible to the driver. This lever is connected with and operates an electrical switch cylinder 6, see Fig. 4, and a damper 27 which varies the proportion of air in the explosive charges drawn from the carbureter 42, and also the sparking cam 24 which controls the spark advance. The lever 20 may be connected directly to the switch cylinder, as in Fig. 1, or by a toothed segment 20ª carried by the lever and in mesh with a pinion 6ª on the cylinder, as illustrated in Fig. 7. In the latter construction, a forward movement of the lever will of course rotate the switch cylinder in the counterclockwise direction. There is also employed in conjunction with the manually operated controlling device a supplementary means for controlling the power of the engine which is automatically dependent for operation upon the state of charge of the accumulator and the speed of the propelling or transmission shaft, and this consists of a solenoid 29 with two windings, one in the main circuit of the accumulator and dynamo motor, and the other in a shunt circuit to the latter, and an armature or core connected with a throttle that varies the volume of the explosive charges admitted to the engine.

The nature and purpose of the part above referred to will be understood from the following more detailed description of their construction and mode of operation.

*The magnetic friction clutch.*—This device is composed essentially of three parts, one of which is a frame 7, another a similar part secured to the frame of the vehicle, and the third an intermediate armature 8. The part 7 is a steel fly wheel keyed to the shaft of the engine and dynamo-motor, and provided near its periphery with an annular recess or groove in its face, in which is located a coil of insulated wire 12. The armature 8 is composed of a plate fixed to the transmission shaft which imparts movement to the car. On the opposite side of the armature 8 an annular frame or rim 16 is secured by bolts and nuts to the frame of the car, or to some part rigidly united thereto. In said rim is a recess or groove in which is wound a coil 17 to constitute a clutch member identical with the coil 12, and its recessed frame. It is readily understood that by passing a current through the coil 12 the armature 8 is caused to attach itself magnetically to the frame 7, thus bringing the car into gear with the engine and dynamo, while, on the other hand, if current be diverted to coil 17, the magnetic attraction between the rim 16 and the armature 8 will act as a brake to stop the car or reduce its speed. The flow of current through the respective coils of the magnetic friction brake is regulated by a special and independent controller 18, placed in convenient position where it can be worked either by hand or by a pedal. This device is of any ordinary construction, and it is illustrated diagrammatically and conventionally in Fig. 3. By its operation current is directed through coil 12 or coil 17 and graduated by the interposition or withdrawal of resistances 19 in the usual manner.

*The manual controller.*—The manual controller, shown in perspective in Fig. 4 and in diagram in Fig. 3 consists of a cylinder 6 of insulating material, to which are secured the necessary conducting plates. A series of contact terminals connected with the several circuits to be controlled bear upon the cylinder and the plates upon the latter are so shaped and connected that the following operations result from the movements of the lever 20 by which the cylinder is turned. When said lever is turned in a forward direction, all of the brushes or terminals 46 connected through resistances 23 with one end of the field circuit of the dynamo, and also a brush 47 connected with the frame of the machine are brought into contact with plate 48, see Fig. 3. As the opposite terminal of the field circuit is connected through the battery 5 with the frame of the machine at 49, the field of the dynamo is thus connected in circuit with the accumulator, with all of the resistances 23 cut out.

The armature or commutator brushes are connected with brushes or terminals 50 and 51 respectively and the ungrounded terminal of the accumulator 5 or that which is not connected with the frame of the machine is also connected with brushes 52 between which resistances 22 are interposed. The brushes 52 are brought into engagement with a plate 53 on the cylinder 6 by the forward movement of the lever 20 to bring the armature 21 into circuit with the resistances 22 and the accumulator 5. To accomplish this the brush 50 contacts with plate 48, and brushes 51 and 52 with plate 53 which latter is cut away as shown so that the brushes 52 may contact therewith successively whereby the resistances 22 are gradually cut out of the circuit. It will be understood that as the device above described is typical of any ordinary switch for starting and reversing a shunt wound motor the closing of the field circuit should occur an instant in advance of the closing of the armature circuit and in practice the brushes or the contact plates will be so arranged as to effect these operations in the order stated. When the resistances 22 have been cut out of circuit the condition is established that corresponds to what may be regarded as the first position of the lever 20 for forward movement. The dynamo 2 being thus started as a motor drives the engine 1. By the same movement of the lever 20 which accomplishes this a brush 54 connected with the ungrounded terminal of the accumulator 5 and a brush 55 connected with the frame through the sparking device are brought in contact with a plate 56 on the cylinder 6 whereby the sparking current is thrown on, so that the engine starts in operation with a power proportional to the extent of the opening of the throttle 28 and the consequent volume of the explosive charges. By the further forward movement of the lever 20 the brushes 46 pass successively off from plate 48 which, as shown in Fig. 3, is suitably notched or stepped for this purpose, so that the resistances 23 are gradually interposed in the field circuit of the dynamo motor and correspondingly higher speeds of the latter are secured by the weakening of its field and lowering of its counter-electro motive force which this produces.

A backward movement of the car is produced by the dynamo alone acting as a motor, and this operation is effected by reversing the lever 20, to bring brushes 46 and 47 into contact with a plate 58 to close the field circuit of the dynamo and by a further movement to bring brush 50 into contact with a plate 61 connected with a plate 59; brush 51 into contact with a plate 60 connected with plate 58 and brushes 52 successively into contact with plate 59. This reverses the direction of the dynamo and causes it to drive the engine and car backward. The above operations are well understood by those skilled in the art and are all in accordance with ordinary and well known practice.

*Manual regulation.*—As the power absorbed by the car depends upon the speed as well as upon the nature of the surface over which it travels it is liable to wide variations, but as long as the amount of power required falls short of that developed by the engine, the excess is utilized in charging the secondary battery. As soon, however, as an increase in propulsion power is required, as will happen, for example, whenever the car encounters an up-grade, the slackening of the speed causes the dynamo to work as a motor, thus supplying the engine with the additional power which it requires to keep up an approximately uniform speed. It thus follows that the speed of the engine is at all times dependent upon the predetermined electrical running conditions of the dynamo.

In the case of internal combustion engines of the class herein contemplated it has heretofore been customary, as one means of rendering available their maximum power, to vary the time of spark relatively to the speed of rotation, and to use for this purpose what is known as a sparking cam, the position of which is altered to give what is termed "the advance." Other means may be employed for this purpose, but in the present case I have shown means for securing a constant ratio between the "sparking advance" and the speed of the engine which consists in a connection between lever 20 and the sparking cam 24, effected by means of a rod 25 shown in detail in Fig. 4. By the operation of the lever 20 for working the controller 6 a corresponding change in the position of the cam 24 will be brought about for each position of the lever, so that the best possible time for sparking according to the speed will thus be assured. Moreover, as the feed of hydro carbon liquid into the mixing chamber of a carbureter is proportional, among other things, to the speed of the engine, it is necessary, in order to maintain in the explosive mixture a constant ratio of hydrocarbon to air, to vary the proportion of air in proportion to the increase of speed. To accomplish this, and to supply the requisite quantity of air corresponding to each degree of speed of the engine, the valve or damper 27 controlling apertures 27ª in the conveying pipe 43, conveying the explosive mixture to the engine is also connected to the rod 25 by an arm 26 so that the opening between pipe 43 and the outer air will be varied and adjusted to correspond to each working position of the lever 20 and admit a properly varied proportion of air into said pipe to form the explosive mixture. In this way the movement of the said lever 20 serves to control simultaneously the speed, sparking advance and air supplied to the explosive charges in such manner as to secure at all times the most efficient working conditions. The running gear of the car is thrown into and out of gear with the engine and dynamo by the magnetic friction clutch, which, as above stated, is under the control of the driver, and when the clutch is demagnetized the set comprising the engine and dynamo-motor continue in operation, charging the secondary battery.

*Automatic controller.*—It being indispensable to the proper running and control of the system, that a means be provided for preventing the battery from being overcharged, or improperly charged, and for regulating the volume of the explosive charges in proportion to the work which the engine is called upon to perform at any given moment and for also reducing as far as practicable the consumption of fuel, I have devised an automatic regulator for effecting these operations, which is illustrated in detail in Figs. 5 and 6. In the pipe or passage 43 which conducts the explosive charges from the carbureter 42 to the internal combustion engine, is arranged a throttle valve, or obturator, 28 of the butterfly form worked by a solenoid 29, provided with a double winding. One of these windings is a fine wire 44 in shunt or derivation to the battery terminals, while the other is of coarse wire 45 included in the main circuit of the dynamo and battery 5. The parts above described are designed and adjusted for the following operations. The fine wire shunt winding permanently energizes the solenoid tending to draw into it the soft iron core 30 against the action of a counter-balancing spring 31, but as long as the battery is not entirely charged the effective pull of the solenoid, due to the magnetizing effect of the shunt winding, is not sufficient to more than partially close the valve 28. The shunt winding 44 is, however, assisted by the magnetizing effect of the series coil 45, the direction of winding of which is such as to add its effect to that of the shunt while the battery is being charged. The combined action of the two windings, as shown in Fig. 8, thus effects a more or less complete closure of the valve 28, and a corresponding reduction of the power of the engine, which therefore slackens its speed until the charging current has been brought back to the proper strength compatible with the condition of the battery plates. On the other hand, if by reason of an increase in the load, such as would be due to the car encountering an up-grade, the speed of the internal combustion engine is reduced, the counter electromotive force of the battery will overcome the electromotive force of the dynamo, and the battery will therefore discharge through the latter. The flow of current in the main winding being then in opposition to that in the shunt, the magnetizing effects of the two partially cancel out, and the force of the spring 31 preponderating, will raise the core 30 and open the valve 28, as shown in Fig. 6, this giving the engine greater power.

By the use of the system or combination hereinbefore described, the following, among other advantages are secured. First, the gas supply to the engine is controlled and so maintained as to assure to the battery, without unnecessary consumption of fuel, the desired uniform condition of charging. Second; the charging current is prevented from exceeding the predetermined and proper strength. Third; whenever the power demanded of the internal combustion engine necessitates drawing on the electrical energy stored in the battery, the volume of the explosive charges admitted to the engine is increased to a degree that enables the latter to supply its maximum power. Fourth; the most efficient working conditions are automatically maintained, so that economy in operation is dependent to a much less degree on the skill and proficiency of the driver.

In the car herein illustrated, the engine and dynamo-motor occupy considerable space lengthwise of the frame, so that I have devised a suspension arrangement by which the bending of the frame of the car will not effect the operation of the combined motor and engine. For this purpose, the motor set is suspended from three different points on the frame, to two of which the dynamo is connected, and to the third the engine. This suspension is secured by means of lugs in pivotal bearings and fastening nuts, as shown in Figs. 1 and 2, the three points of suspension being indicated at 32, 33 and 34.

Although the magnetic brake is shown and described in detail herein in order to exhibit a complete and operative system, it is not claimed in the present application.

Having now described my invention what I claim is:

1. The combination with a mixed power set comprising an engine of the kind described, a dynamo motor connected therewith and an accumulator in circuit with the dynamo motor, of a manually operated controller for the set, and independent means for controlling the power of the engine, automatically dependent for operation upon the state of charge of the accumulator and the speed of the shaft to which the power of the set is applied, as set forth.

2. The combination with a mixed power set comprising an engine of the kind described, a dynamo motor connected therewith and an accumulator in circuit with the dynamo motor, of a manually operated circuit controller for the dynamo motor, an air supply regulator for the engine operatively connected with the said circuit controller, and independent means for controlling the power of the engine, automatically dependent for operation upon the state of charge of the accumulator and the speed of the shaft to which the power of the set is applied, as set forth.

3. The combination with a mixed power set comprising an engine of the kind described, a dynamo motor connected therewith and an accumulator in circuit with the dynamo motor, of a manually operated circuit controller for the dynamo motor, an air supply regulator for the engine operatively connected with the said circuit controller, a throttle valve for the engine and independent means for controlling said valve, automatically dependent for operation upon the state of charge of the accumulator and the speed of the vehicle or other driven device, as set forth.

4. The combination with a mixed power set comprising an engine of the kind described, a dynamo motor connected therewith and an accumulator in circuit with the dynamo motor, and a manually operated circuit controller for the dynamo motor, an ignition device and an air supply regulator for the engine both operatively connected with said circuit controller, and independent means for controlling the volume of the explosive charges admitted to the engine, automatically dependent for operation upon the state of charge in the accumulator and the speed of the vehicle or other device driven by the set, as set forth.

5. The combination with a mixed power plant for vehicles comprising an engine of the kind described, a dynamo motor connected therewith and an accumulator in circuit with the dynamo motor, of a manually operated controller therefor, a valve mechanism for varying the volume of the explosive charges admitted to the engine, and an electro-magnetic regulator operated by the conjoint action of the battery and dynamo for controlling the said valve mechanism, whereby the power of the engine will be automatically varied in accordance with the state of charge of the battery, the speed of the vehicle and the nature of the gradient over which it travels, as set forth.

6. The combination with a mixed power plant or system comprising an engine of the kind described, a dynamo motor connected therewith and an accumulator in circuit with the dynamo motor, of a manually operated controller therefor, means for regulating the admission of explosive charges to the engine, an electro magnet or solenoid controlling said means, and energized by two windings, one in shunt to the battery and the other in series with the dynamo and battery, whereby the power of the engine will be controlled, as set forth.

7. A propulsion plant comprising in combination an internal combustion engine, a dynamo motor driven thereby, a secondary battery in circuit with the dynamo motor, an electrical controller, an engine ignition device, a connection between the same and the lever of the controller, an engine throttle valve and a solenoid for controlling the same having two energizing windings, one in shunt to and the other in series with the secondary battery, as and for the purpose set forth.

8. In a motor vehicle the combination of the following elements to wit:—an internal combustion engine, a dynamo motor driven thereby, an accumulator in circuit with the dynamo motor, an electrical controller for said dynamo motor, an engine ignition device and an air supply regulator, both operatively connected with said circuit-controller, a throttle for controlling the volume of explosive charges to the engine, and a solenoid for operating said throttle, provided with two energizing windings, one in shunt to and the other in series with the secondary battery, as and for the purposes set forth.

9. A motor vehicle comprising in combination a frame, bearings in said frame, a driving axle in said bearings, a driven axle in said bearings, wheels on said axle, an internal combustion engine, a dynamo motor, a shaft connecting said engine and dynamo motor, an electro-magnet on said shaft, a power transmission shaft, a magnetic element on said transmission shaft disposed near said electro-magnet, an electro-magnet on the frame disposed near said electro-magnetic element, means connecting said transmission shaft with the driven axle, an electrical accumulator, an engine control, electrical means operating said control, an ignition device, an air supply, means for controlling the same, an electrical controller for the dynamo motor and a connection between said controller and the means for controlling the ignition device and the engine air supply as set forth.

In testimony whereof I have signed my name to this specification in the presence of two subscribing witnesses.

HENRI PIEPER.

Witnesses:
  VICTOR HAMAL,
  FERNAND BROUSSOUSSE.